United States Patent
Bostick et al.

(10) Patent No.: US 10,560,508 B2
(45) Date of Patent: Feb. 11, 2020

(54) PERSONALIZED VIDEO PLAYBACK

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 113 days.

(21) Appl. No.: 15/459,470

(22) Filed: Mar. 15, 2017

(65) Prior Publication Data
US 2018/0270283 A1 Sep. 20, 2018

(51) Int. Cl.
G06F 15/16 (2006.01)
H04L 29/06 (2006.01)
H04L 29/08 (2006.01)

(52) U.S. Cl.
CPC .......... H04L 65/604 (2013.01); H04L 67/306 (2013.01)

(58) Field of Classification Search
CPC ....... H04L 65/60; H04L 67/42; H04L 67/306; H04L 67/22; G06Q 10/10; H04N 5/783; H04N 5/7605; G11B 27/005
See application file for complete search history.

(56) References Cited

U.S. PATENT DOCUMENTS

| | | |
|---|---|---|
| 5,717,468 A | 2/1998 | Baryla |
| 9,336,268 B1 * | 5/2016 | Moudy ................. G06F 16/244 |
| 9,712,587 B1 * | 7/2017 | Alfishawi .......... G06Q 30/0269 |
| 2007/0061851 A1 | 3/2007 | Deshpande |
| 2007/0288971 A1 | 12/2007 | Cragun et al. |
| 2008/0107402 A1 * | 5/2008 | Angiolillo ............ H04N 5/4403 386/234 |
| 2009/0060467 A1 | 3/2009 | Grigsby et al. |
| 2010/0162286 A1 | 6/2010 | Berry |
| 2012/0300061 A1 | 11/2012 | Osman et al. |
| 2013/0262365 A1 * | 10/2013 | Dolbear ................... G06N 5/02 706/47 |
| 2013/0298146 A1 * | 11/2013 | Conrad ................ H04N 21/252 725/12 |

(Continued)

OTHER PUBLICATIONS

List of IBM Patents or Patent Applications Treated as Related, Dec. 5, 2019, 1 page.

(Continued)

*Primary Examiner* — Cheikh T Ndiaye

(74) *Attorney, Agent, or Firm* — James Nock; Andrew D. Wright; Roberts Mlotkowski Safran Cole & Calderon, P.C.

(57) ABSTRACT

Systems and methods for personalizing video playback are disclosed. In embodiments, a computer-implemented method, comprises: initiating, by a computing device, a video playing session of a video; recording, by the computing device, user initiated playback actions during the video playing session as playback event data; determining, by the computing device, context data based on content of the video, and saving the context data; determining, by the computing device, insights regarding the user playback event data utilizing the context data; and generating, by the computing device, one or more recommendations based on the insights.

20 Claims, 5 Drawing Sheets

(56) References Cited

U.S. PATENT DOCUMENTS

2014/0143817 A1    5/2014  Yeh
2014/0195919 A1*  7/2014  Wieder ................ H04L 67/306
                                              715/730
2015/0110464 A1    4/2015  Jackson et al.
2016/0182921 A1    6/2016  Martin et al.
2017/0359626 A1*  12/2017  Chen ................. H04N 21/6587

OTHER PUBLICATIONS

Specification "Personalized Video Playback" and Drawings in U.S. Appl. No. 16/694,002 filed Nov. 25, 2019, 39 pages.

\* cited by examiner

PERSONALIZED VIDEO PLAYBACK

BACKGROUND

The present invention relates generally to video controls and, more particularly, to personalized video playback.

Videos are available in a number of different formats, including via a television channel, a video stream, and storage medium (digital versatile disk, etc.). Different devices may be utilized to implement basic control functions such as playing, pausing and rewinding of the video. In many cases, a user has no control over the content of a video, but may use the basic control functions of a computing device to replay or pause sections of the video to manage the user's interaction with the content.

SUMMARY

In an aspect of the invention, a computer-implemented method includes: initiating, by a computing device, a video playing session of a video; recording, by the computing device, user initiated playback actions during the video playing session as playback event data; determining, by the computing device, context data based on content of the video, and saving the context data; determining, by the computing device, insights regarding the user playback event data utilizing the context data; and generating, by the computing device, one or more recommendations based on the insights.

In another aspect of the invention, there is a computer program product for personalizing video playback. The computer program product comprises a computer readable storage medium having program instructions embodied therewith. The program instructions are executable by a computing device to cause the computing device to: initiate a video playing session; record user initiated pause and replay actions during the video playing session as playback event data in a video playback repository; determine insights regarding the user playback event data; generate one or more recommendations based on the insights; and save the one or more recommendations as rules to automatically implement the recommendation.

In another aspect of the invention, there is a system for personalizing video playback. The system includes a CPU, a computer readable memory and a computer readable storage medium associated with a computing device. The system also includes program instructions to initiate a video playing session of a video; program instructions to record user initiated playback actions during the video playing session as playback event data; program instructions to determine context data based on content of the video, and saving the context data; and program instructions to determine insights regarding the user playback event data utilizing the context data; wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
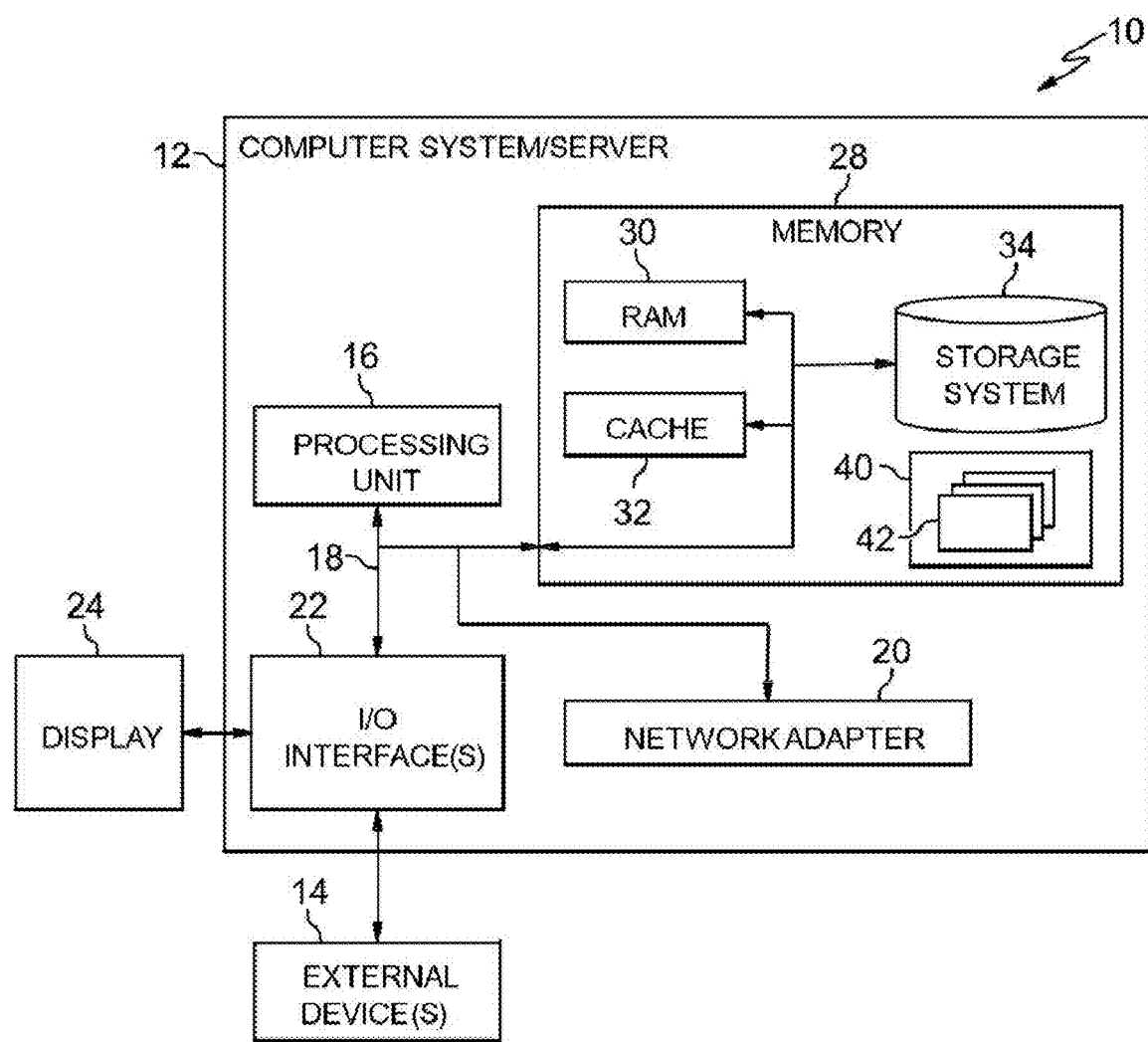
FIG. 1 depicts a computing infrastructure according to an embodiment of the present invention.

The present invention relates generally to video controls and, more particularly, to personalized video playback. Advantageously, embodiments of the present invention enable automatic pausing, replaying, initiating of subtitles, or other actions to address potential video comprehension problems based on insights derived from a user's watching patterns.

In embodiments, a system records patterns pertaining to how a user watches a video on a personal device, such as a smartphone, tablet or laptop. In aspects, an emphasis (more weight) is given to a user's actions regarding pausing or replaying portions of a video. In embodiments, cognitive analysis is applied to the paused and replayed sections of video to determine patterns related to video comprehension. In aspects, cognitive insights are generated with recommended actions for a system to automatically pause or replay portions of a video. Further, in embodiments, recommended actions are presented to a user and, if selected, the actions are initiated for videos that match the derived cognitive insights.

Methods of the invention observe how well a user is comprehending a video playing on a personal device, and offer automatic adjustments as to how that video is played. By developing insights into why a user has paused or replaced a section of video, systems of the invention can automatically perform a matching action when the same situation is encountered when watching a different video. For example, embodiments of the present invention may generate a rule to automatically pause a text-heavy section of a video long enough for a reader to read the text completely, or to automatically replay a section of video that might have been difficult for the user to understand upon first viewing.

Embodiments of the invention provide: cognitive insights for video comprehension based upon observed historical patterns for a user of video playback, pause, and replay functions; cognitive insights for video comprehension based upon observed historical patterns for an aggregate of users with similar video comprehension patterns; and implementation of recommended actions from derived cognitive insights to automatically pause and replay portions of video to maximize user comprehension.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
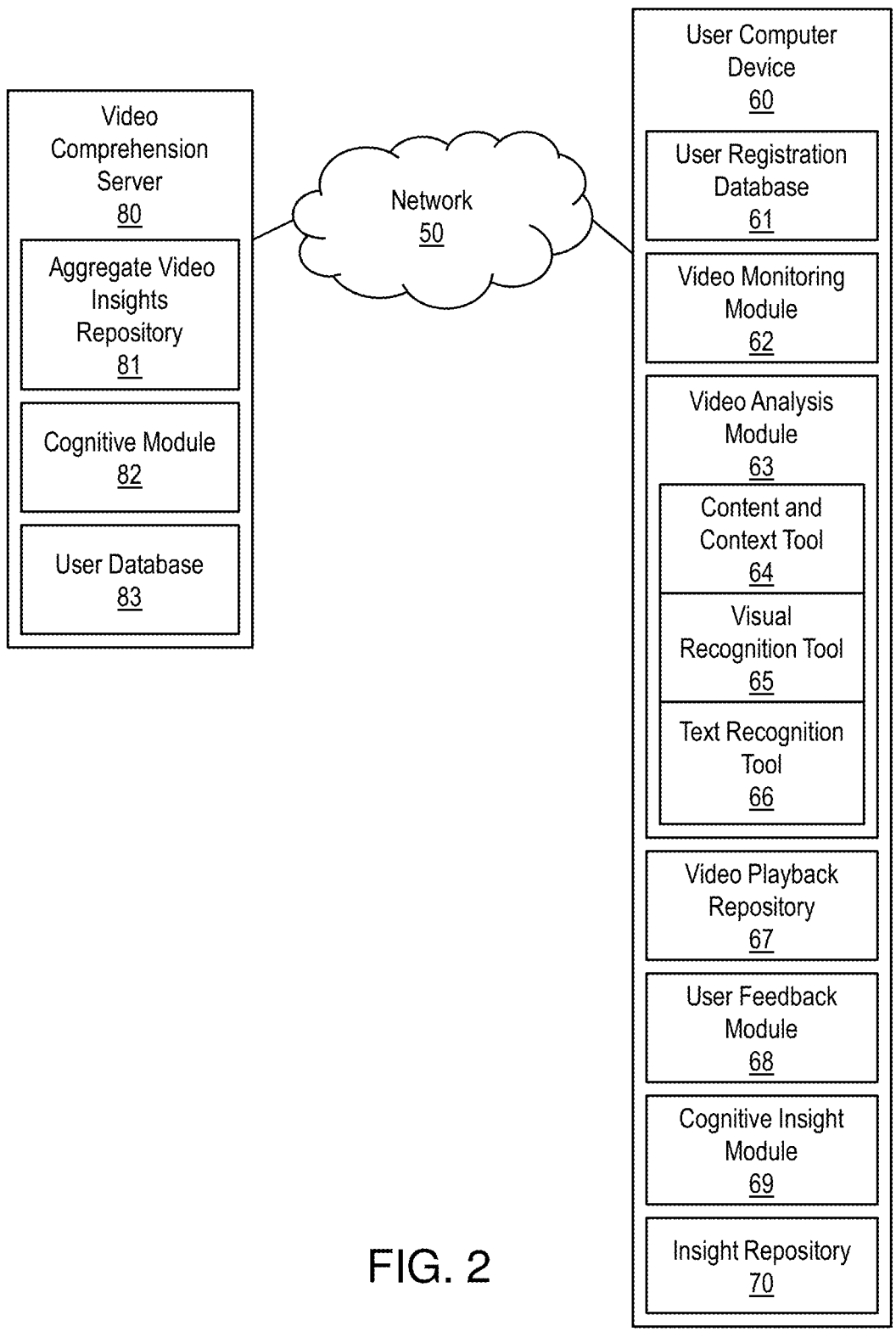
FIG. 2 shows an exemplary environment in accordance with aspects of the invention.

FIG. 2 shows an exemplary environment in accordance with aspects of the invention. The environment includes a user computer device 60 connected to a network 50. The user computer device 60 may comprise a computer system 12 of FIG. 1, and may be connected to the network 50 via the network adapter 20 of FIG. 1. The user computer device 60 may be a general purpose computing device, such as a desktop computer, laptop computer, tablet computer, smartphone, etc. Alternatively, the user computer device 60 may be configured as a special purpose computing device that is part of a system for viewing digital videos. For example, the user computer device 60 may be a smart-television or digital video player. In embodiments, the user computer device 60 includes a user registration database 61 for receiving user registration or user profile information.

In aspects, the user computer device 60 includes a video monitoring module 62 and a video analysis module 63 configured to perform one or more of the functions described herein, which may include one or more program modules (e.g., program module 42 of FIG. 1) executed by the user computer device 60. In embodiments, the video monitoring module 62 is configured to monitor user playback actions (e.g., pause, fast forward, rewind, replay) of a video and record the user playback actions in a video playback repository 67. In embodiments, the video analysis module 63 analyzes visual and audio content of video segments associated with the recorded playback activity for context data, and saves the context data in the video playback repository 67. In aspects, the video analysis module 63 includes: a content and context tool 64 for determining and understanding a video segment's content and context; a visual recognition tool 65 for determining content of a video image to create classifiers which identify objects, events and settings; and a test recognition tool 66 for converting the sound of human voices into written text (e.g., creating a written transcript of what is being said in the video). The video analysis module 63, the content and context tool 64 and the visual recognition tool 65 may utilize existing video analysis software and tools in accordance with aspects of the invention. For example, video analyzing software may be utilized with the video analysis module 63 to determine a picture's content and context, such as who is in a video frame, the age of a person in the video frame, and high level tags regarding the person's surroundings.

In aspects, the user computer device 60 further includes a user feedback module 68 and a cognitive insight module 69 which are configured to perform one or more of the functions described herein, and which may include one or more program modules (e.g., program module 42 of FIG. 1) executed by the user computer device 60. In embodiments, the user feedback module 68 is configured to determine user audio and visual reactions to the video segments associated with the recorded playback activity, and record the reactions in the video playback repository 67. In embodiments, the cognitive insight module 69 is configured to analyze data in the video playback repository 67 to determine insights regarding user playback activity, generate recommendations based on the determined insights, and save the recommendations in an insight repository 70. In embodiments, the user computer device 60 may include additional or fewer components than those shown in FIG. 2. In embodiments, separate components may be integrated into a single computing component or module. Additionally, or alternatively, a single component may be implemented as multiple computing components or modules.

The network 50 may be any suitable communication network or combination of networks, such as a local area network (LAN), a general wide area network (WAN), and/or a public network (e.g., the Internet). In embodiments, the user computer device 60 is in communication with a video comprehension server 80 via the network 50. The video comprehension server 80 may include components of the computer device 12. In aspects, the video comprehension server 80 is a special purpose computer device adapted to receive insights determined by the cognitive insight module 69 of one or more user computer devices 60, and save the insights in an aggregate video insights repository 81. In aspects, the video comprehension server 80 may receive and save user information (e.g., user profile information including language preferences, geographic location, etc.) for a plurality of users (e.g., user of one or more user computer devices 60) in a user database 83. In embodiments, a cognitive module 82 may include one or more program modules (e.g., program module 42 of FIG. 1) executed by the video comprehension server 80, wherein the cognitive module 82 is configured to analyze data in the user database 83 and/or aggregate video insight repository 81 to derive aggregate insights, and save the aggregate insights in the aggregate video insight repository 81.

Figure 3:
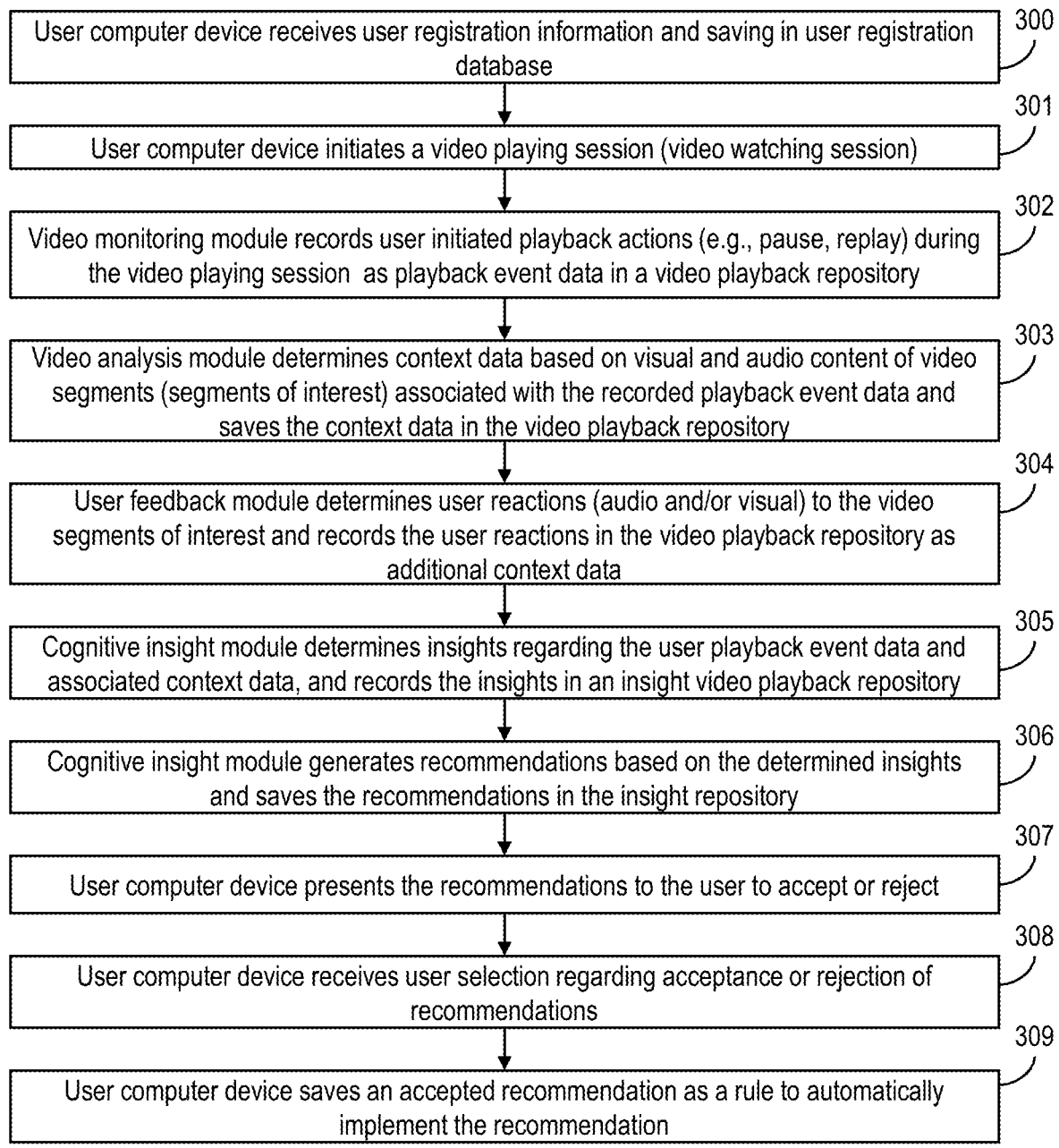
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300, the user computer device 60 receives user registration information from a user. For example, a user may manually input profile data such as language preference, geographic location, etc., into the user registration database 61 via a user input device (e.g., external device 14).

At step 301, the user computer device 60 initiates a video playing session (video watching session) wherein a video is played for viewing by a user on a display (e.g., display 24). For example, the user computer device 60 may initiate the playing of a digital educational video.

At step 302, the video monitoring module 62 of the user computer device 60 records pause and replay actions initiated by a user during the video playing session as a playback event data in the video playback repository 67. By way of example, a user may pause, rewind, and/or fast forward the video utilizing conventional video playback control devices, such as buttons on a remote control, touchscreen controls of the user computer device 60, etc. The video monitoring module 62 recognizes that the user has initiated a video control action (e.g., video is paused) and records this as playback event data in the video playback repository 67. Examples of recorded playback event data in the video playback repository 67 are illustrated in Table 1 below.

TABLE 1

| Exemplary recorded playback event data. | |
|---|---|
| Video ID: | 436287642398 |
| Pause timestamp: | 13:34 |
| Pause duration: | 0:15 |
| Subsequent action: | Play |
| Video ID: | 436287642399 |
| Pause timestamp: | 14:55 |
| Pause duration: | 0:05 |
| Subsequent action: | Replay |
| Replay segment: | 14:02-14:55 |

At step 303, the video analysis module 63 determines context data based on visual and audio content of video segments associated with the recorded playback event data (hereafter video segment of interest) and saves the context data in the video playback repository 67. For example, a video segment of interest may comprise 30 seconds of video before and after a recorded playback segment, or may comprise only the playback segment itself (e.g., a replayed segment of video). The video analysis module 63 may utilize various video analysis methods and tools to determine the visual and audio content of the video segment of interest. In embodiments, the content and context tool 64 employs deep learning to understand a video segment of interest's picture content and context. In aspects, this may include determining who is in a video frame, their age, and high level tags about their surroundings. In aspects, the visual recognition tool 65 is utilized to determine the content of video images, and to create classifiers which identify objects, events and settings associated with the video images. In embodiments, the text recognition tool 66 is utilized to convert audio communications (e.g., human voice) into written text. In this way, the text recognition tool 66 may create a written transcript of the video segment of interest's sound (audio data). In aspects of the invention, the playback event data previously recorded at step 302 is updated with the context data of step 303. Table 2 below illustrates updated exemplary recorded playback event data. In the examples shown in Table 2, the video analysis module 63 recognizes that, in a first video segment of interest (Video ID: 436287642398), there are 250 words displayed. Moreover, in a second video clip (Video ID: 436287642399) the video analysis module 63 recognizes that a second video segment of interest includes the following context objects: person, Sam, talking-to-camera, office. Further, in the second video clip (Video ID: 436287642399) the video analysis module 63 recognizes the following dialog of a speaker Sam: "And next we open up the document folder".

TABLE 2

| Updated exemplary recorded playback event data. | |
|---|---|
| Video ID: | 436287642398 |
| Pause timestamp: | 13:34 |
| Pause duration: | 0:15 |
| Subsequent action: | Play |
| Identify Objects: | Text, 250 words |
| Video ID: | 436287642399 |
| Pause timestamp: | 14:55 |
| Pause duration: | 0:05 |
| Subsequent action: | Replay |
| Replay segment: | 14:02-14:55 |

TABLE 2-continued

Updated exemplary recorded playback event data.

| | |
|---|---|
| Identify Objects: | Person, Sam, Talking-to-camera, Office |
| Audio: | Sam - "And next we open up the document folder" |

Optionally, at step 304, the user feedback module 68 determines the user's audio and/or visual reactions to one or more video segments of interest, and records the reactions in the video playback repository as additional context data. In embodiments, the feedback module 68 may utilize pictures or video of the user taken by a camera (not shown) of the user computer device 60 while the user during the video playing session. For example, facial recognition software may be utilized to translate facial recognition data into data indicating emotions of the viewer (e.g., confused, amused, surprised, etc.), or the activity the viewer was doing (e.g., reading looking closely at one area of a video, etc.). In aspects, the feedback module 68 may utilize a microphone of the user computer device 60 to capture sound responses of the user during the video playing session. For example, speech-to-text software may be utilized to translate verbalizations of the viewer into a written transcript. In embodiments, the user feedback module 68 updates playback event data recorded in the video playback repository 67, as illustrated in Table 3 below. For example, the user feedback module 68 may determine that a user's facial expressions indicate that they are reading, and may further determine that the user asked "What did that say?", when viewing the first video segment of interest (Video ID: 436287642398). A variety of facial recognition and voice recognition tools may be utilized in conjunction with the user feedback module 68.

TABLE 3

Further updated exemplary recorded playback event data.

| | |
|---|---|
| Video ID: | 436287642398 |
| Pause timestamp: | 13:34 |
| Pause duration: | 0:15 |
| Subsequent action: | Play |
| Identify Objects: | Text, 250 words |
| User facial information: | Reading |
| User speech: | "What did that say?" |
| Video ID: | 436287642399 |
| Pause timestamp: | 14:55 |
| Pause duration: | 0:05 |
| Subsequent action: | Replay |
| Replay segment: | 14:02-14:55 |
| Identify Objects: | Person, Sam, Talking-to-camera, Office |
| Audio: | Sam - "And next we open up the document folder" |

At step 305, the cognitive insight module 69 determines insights regarding user playback event data and associated context data, and records the insights in the insight repository 70. In embodiments, the cognitive insight module 69 records the insights with accompanying confidence level data, wherein the confidence level data predicts the accuracy of the insight based upon the strength of data used to derive it.

In aspects, determined insights relate to how a user comprehends what they are watching during the video playing session. In embodiments, the determined insights identify a problem associated with the user's comprehension of the video that is being viewed in the video playing session. For example, the user computer device 60 may observe how long a user pauses a video across multiple instances, and may utilize this information to deduce the user's reading speed. Thereafter, the cognitive insight module 69 may determine from event data in the video playback repository 67, with an 85% confidence level, that the user pauses text-rich video frames when the speed of advancement of on-screen text exceeds the user's reading speed. See the first example illustrated in Table 4 below. By way of another example, the cognitive insight module 69 may determine from event data in the video playback repository 67, with a 75% confidence level, that "the user struggles to understand dialog delivered by Sam". See the second example illustrated in Table 4 below.

TABLE 4

Exemplary insights determined by cognitive insight module

| | |
|---|---|
| Insight: | The user pauses text-rich video frame when it exceeds their reading speed |
| Confidence level: | 85% |
| Recommendation action | Pause text-rich video frames to meet user's reading speed of 180 words per minute |
| Insight: | The user struggles to understand dialog delivered by Sam |
| Confidence level: | 75% |
| Recommendation action: | Automatically replay portions of video with dialog spoken by Sam |
| Recommendation action: | Automatically turn on subtitles for portions of video with dialog spoken by Sam |

At step 306, the cognitive insight module 69 generates recommendations based on the determined insights of step 305, and saves the recommendations in the insight repository 70. In embodiments, the recommendations comprise actions to take the next time the user encounters a similar video viewing situation. In aspects, recommendations generated at step 306 are generated to address one or more problems with user comprehension that are identified by the cognitive insight module 69 at step 305. By way of example, Table 4 above illustrates a first recommendation to "pause text-rich video frames to meet user's reading speed of 180 words per minute" based on the determined insight: "the user pauses text-rich video frame when it exceeds their reading speed". By way of another example, Table 4 above illustrates second and third recommendations to "automatically replay portions of video with dialog spoken by Sam" and "automatically turn on subtitles for portions of video with dialog spoken by Sam" based on the determined insight: "the user struggles to understand dialog delivered by Sam".

At step 307, the user computer device 60 presents the one or more recommendations determined at step 306 to the user for approval or rejection (accept or reject recommendation) by the user. For example, the user computer device 60 may present recommendations "automatically replay portions of video with dialog spoken by Sam" and "automatically turn on subtitles for portions of video with dialog spoken by Sam" based on the determined insight: "the user struggles to understand dialog delivered by Sam". Recommendations may be provided on a display 24 of the user computer device 60, for example.

At step 308, the user computer device 60 receives a user selection regarding the approval or rejection of the one or more recommendations. Different methods for querying a user may be utilized in accordance with step 308. For example, a popup window may be presented to the user with the option for the user to click on a button entitled "accept"

next to a recommendation, and the user computer device 60 will then recognize receipt of the user selection of the "accept" button.

At step 309, the user computer device 60 saves an accepted recommendation as a rule to automatically implement the accepted recommendation. In embodiments one or more rules are saved in the insight repository 70. In aspects rules saved on the user computer device 60 are configured to improve a user's comprehension of a video. For example, the user computer device 60 may receive a user's selection to accept the recommendation "automatically turn on subtitles for portions of video with dialog spoken by Sam" at step 308, and may thereafter save a rule in the user computer device 60 such that when the user computer device 60 determines that Sam is speaking during a video playing session, the user computer device 60 automatically turns on subtitles.

In an alternative embodiment, the user computer device 60 may automatically accept the one or more recommendations generated at step 306 and save the one or more recommendations as one or more rules to automatically implement the one or more recommendations, without the need for steps 307 or 308 of FIG. 3.

Figure 4:
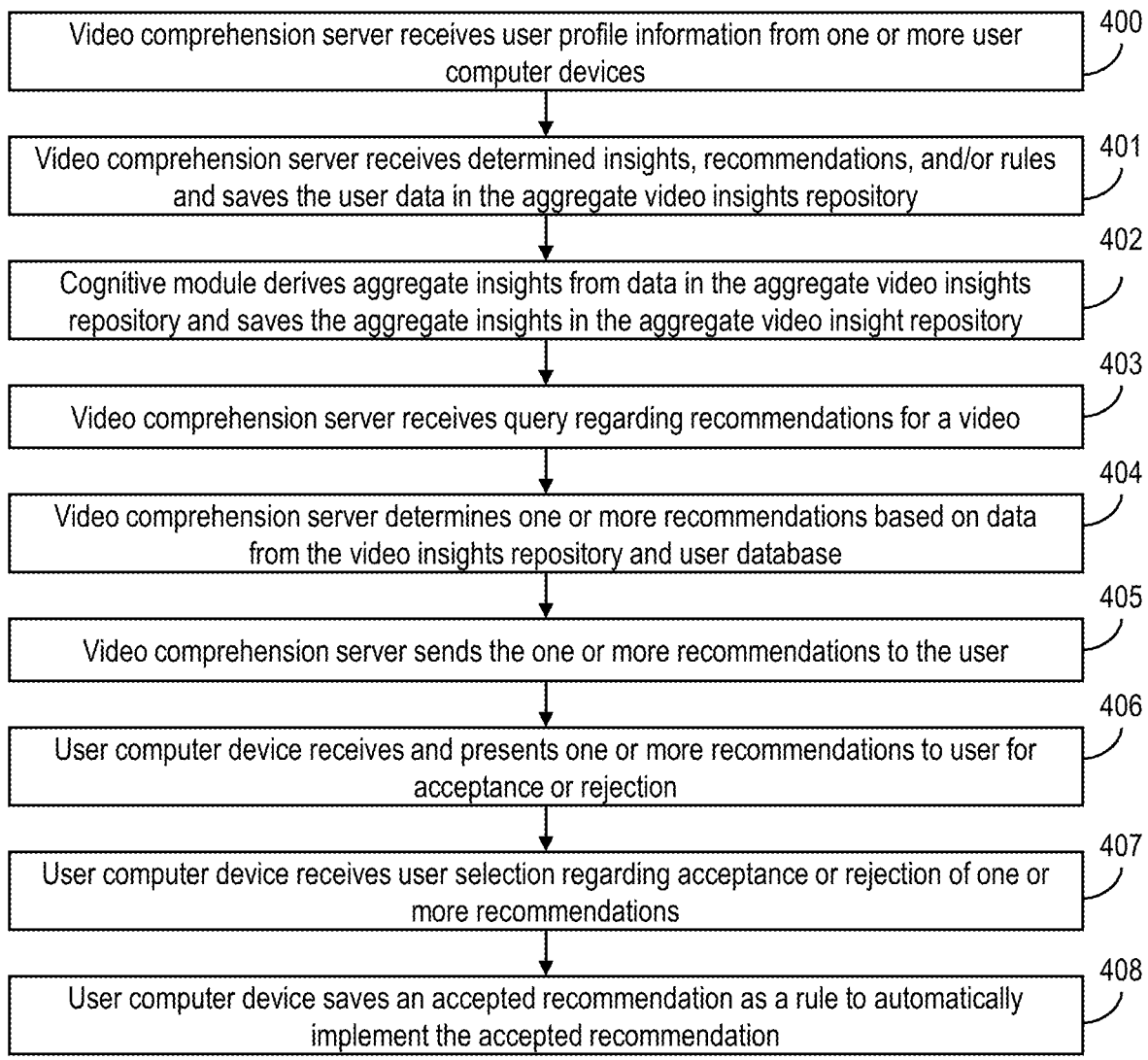
FIG. 4 shows a flowchart of steps of a method in accordance with aspects of the invention.

FIG. 4 shows a flowchart of a method in accordance with aspects of the invention. Steps of the method of FIG. 4 may be performed in the environment illustrated in FIG. 2, and are described with reference to elements shown in FIG. 2.

In embodiments of the invention, at step 400, the video comprehension server 80 receives user profile information and stores the user profile information in the user database 83. User profile information can be any information that assists in video comprehension server 80 in identifying and categorizing users. For example, the video comprehension server 80 may receives information regarding a user's preferred language and their geographic location.

At step 401, the video comprehension server 80 receives from one or more remote user computer devices 60, insights determined at step 305 of FIG. 3, the one or more recommendations generated at step 306 of FIG. 3, and/or the rules saved at step 309 of FIG. 3, and saves the user data in the aggregate video insights repository 81. In embodiments, the user computer device 60 sends the insights, the one or more recommendations and/or the rules to the video comprehension server 80 via the network 50 with associated playback event data from the video playback repository. For example, data from the data Table 3 depicted above may be sent to the remote video comprehension server 80.

At step 402, the cognitive module 82 derives aggregate insights from data in the aggregate video insights repository and user profile data from the user database 83, and saves the aggregate insights in the aggregate insight repository 81. For example, the cognitive module 82 may determine that many users having an average reading speed of 180 words per minute pause an educational video during a portion of the video showing a large portion of text, and may derive the insight that users having an average reading speed of 180 words per minute have difficulty reading the large portion of text during the time period that the text is shown in the educational video. In this example, the average reading speed of users may be determined by the cognitive module 82 from user profile data saved in the user database 83.

At step 403, the video comprehension server 80 receives a query from a user computer device 60 or third party computer (not shown) regarding recommendations for a video. For example, the user computer device 60 may send a query to the video comprehension server 80 with a request for a video (e.g., the user wishes to download a video from the video comprehension server 80 or a related site), wherein the query comprises a request for recommendations that may increase the user's comprehension of the video. For example, the video comprehension server 80 may receive a query from the user computer device 60 regarding an educational video that a user is about to play on the user computer device 60.

At step 404, the video comprehension server 80 determines one or more recommendations in response to the query of step 403, wherein the one or more recommendations are based on data from the aggregate video insights repository 81 and the user database 83. For example, the video comprehension server 80 may receive a query regarding an educational video, and may utilize data regarding the educational video that has been aggregated in the aggregate video insights repository 81 to determine the recommendations. For example, the video comprehension server 80 may determine that the user has an average reading speed of 180 words per minute, that other users having an average reading speed of 180 words per minute have difficulty reading a large portion of text during a time period that the text is shown in the educational video, and may determine the recommendation: "pause text-rich video frames to meet user's reading speed of 180 words per minute".

At step 405, the video comprehension server 80 sends the one or more recommendations to the user computer device 60 via the network 50. As an example, the video comprehension server 80 may send the user computer device 60 the recommendation to: "pause text-rich video frames to meet user's reading speed of 180 words per minute", in response to the query received at step 403.

At step 406, the user computer device 60 receives the one or more recommendations sent at step 405, and presents the one or more recommendations to the user for acceptance or rejection. In embodiments, step 406 is accomplished in the same manner as step 307 of FIG. 3.

At step 407, the user computer device 60 receives a user selection regarding the approval or rejection of the one or more recommendations. Different methods for querying a user may be utilized in accordance with step 407. For example, a popup window may be presented to the user with the option for the user to click on a button entitled "accept" next to a recommendation, and the user computer device 60 will then recognize receipt of the user selection of the "accept" button.

At step 408, the user computer device 60 saves an accepted recommendation as a rule to automatically implement the accepted recommendation. In embodiments one or more rules are saved in the insight repository 70. In aspects rules saved on the user computer device 60 are configured to improve a user's comprehension of a video. For example, the user computer device 60 may receive a user's selection to accept the recommendation "pause text-rich video frames to meet user's reading speed of 180 words per minute" at step 407, and may thereafter save a rule in the user computer device 60 such that when the user computer device 60 determines that a text-rich video frame is displayed during a video playing session, the user computer device 60 automatically pauses the frame.

In an alternative embodiment, the user computer device may automatically accept the one or more recommendations sent to the user computer device at step 405, and may save the one or more recommendations as one or more rules to automatically implement the one or more recommendations, without the need for steps 406 or 407 of FIG. 4

Figure 5A:
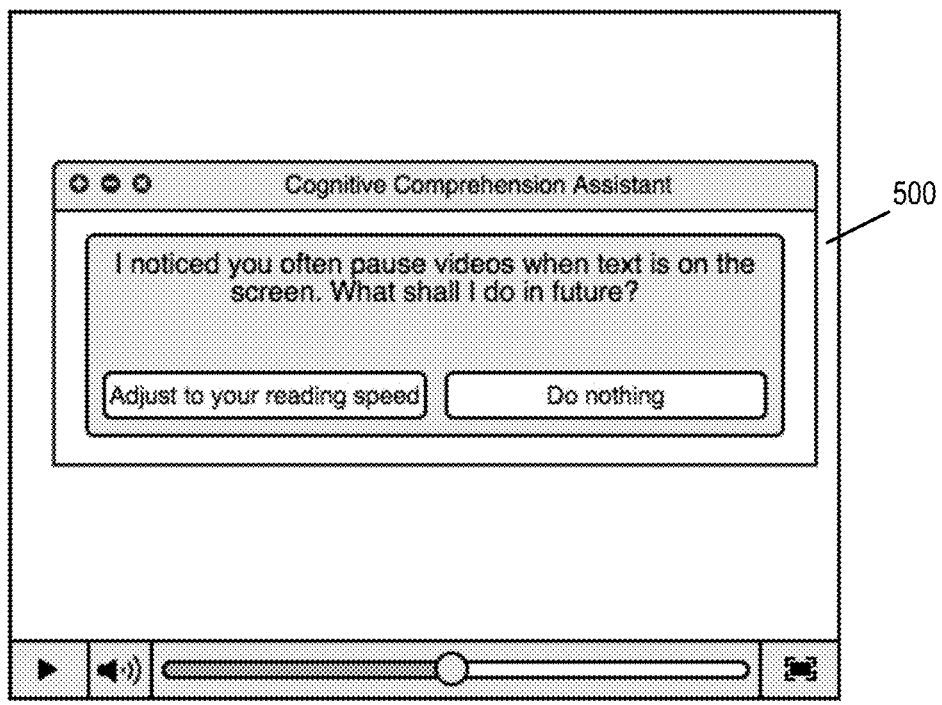
FIGS. 5A and 5B illustrate exemplary recommendations displayed to a user during embodiments of the invention.
Figure 5B:
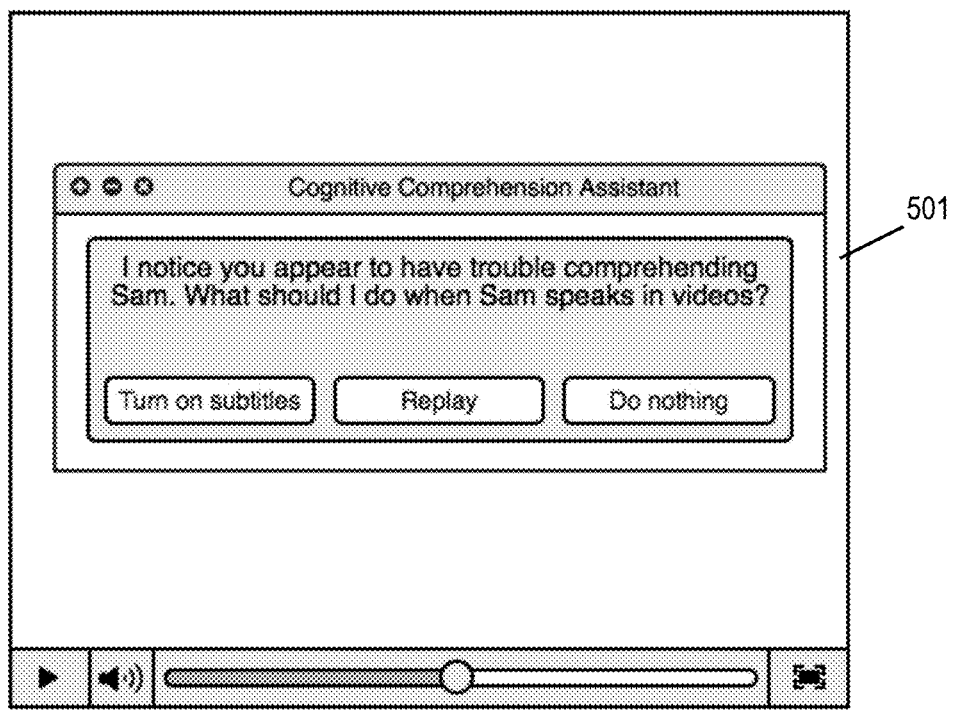

FIGS. 5A and 5B illustrate exemplary recommendations displayed to a user during embodiments of the invention. For example, FIGS. 5A and 5B illustrate recommendations that may be presented to a user during step 307 of FIG. 3 or step 406 of FIG. 4.

An exemplary scenario will now be discussed with reference to FIGS. 3, 5A and 5B. In this scenario, a user has saved user registration information in the user registrations database 61 of the user computer device 60 in accordance with step 300 of FIG. 3, wherein the user registration information includes the information that the user has an average reading speed of 180 words per minute. The user then starts playing the educational video in accordance with step 301 of FIG. 3. The user rewinds and pauses the educational video when a large portion of text is displayed on the screen, and the video monitoring module 62 records the pausing of the educational video as a first set of playback event data in the video playback repository 67 in accordance with step 302 of FIG. 3. Additionally, the user rewinds the educational video whenever a speaker "Sam" appears and the video monitoring module 62 records the rewinding of the educational video as a second set of playback event data in the video playback repository 67 in accordance with step 303 of FIG. 3.

The video analysis module 63 determines that text is being shown on the screen (context data) when the user pauses the video based on the visual and audio content of the video segment of interest associated with the first set of recorded playback event data, in accordance with step 303 of FIG. 3. The video analysis module 63 also determines that Sam is being shown on the screen (context data) when the user rewinds the video based on the visual and audio content of the video segment of interest associated with the second set of recorded playback event data, in accordance with step 303 of FIG. 3. In this scenario, the user also exclaims "that's too fast" out loud while watching the text, and the user feedback module 68 determines and records the user's reaction with the first set of playback event data in accordance with step 304 of FIG. 3.

Still referencing the exemplary scenario, the cognitive insight module 69 determines, based on the first set of recorded playback event data, that the user is having trouble reading the text within the time period it is being displayed in the educational video, in accordance with step 305 of FIG. 3. The cognitive insight module 69 then generates the recommendation: "adjust text display time to user's reading speed", in accordance with step 306 of FIG. 3. The user computer device 60 then presents the recommendation in the form of a question, enabling the user to accept or reject the recommendation in accordance with step 307 of FIG. 3. For example, FIG. 5A illustrates a popup window 500 displaying the question: "I noticed you often pause videos when text is on the screen. What shall I do in the future?" with the options to "Adjust to your reading speed" or "Do nothing". In this scenario, the user selects "Adjust to your reading speed", and the user computer device 60 receives the user's selection in accordance with step 308 of FIG. 3. The user computer device 60 saves the accepted recommendation as a rule to automatically adjust the amount of time the text is displayed to a user based on the user's reading speed, by automatically pausing the text for a predetermined period of time, in accordance with step 309 of FIG. 3.

Still referencing the exemplary scenario, the cognitive insight module 69 also determines, based on the second set of recorded playback event data, that the user is having trouble understanding Sam, in accordance with step 305 of FIG. 3. The cognitive insight module 69 then generates the recommendations: "turn on subtitles or replay when Sam speaks", in accordance with step 306 of FIG. 3. The user computer device 60 then presents the recommendation in the form of a question, enabling the user to accept or reject the recommendation in accordance with step 307 of FIG. 3. For example, FIG. 5B illustrates a popup window 501 displaying the question: "I notice you appear to have trouble comprehending Sam. What should I do when Sam speaks in videos?" with the options to "Turn on subtitles", "Replay", or "Do nothing". In this scenario, the user selects "Turn on subtitles", and the user computer device 60 receives the user's selection in accordance with step 308 of FIG. 3. The user computer device 60 saves the accepted recommendation as a rule to automatically adjust turn on subtitles when Sam is speaking, in accordance with step 309 of FIG. 3.

In embodiments, a service provider could offer to perform the processes described herein. In this case, the service provider can create, maintain, deploy, support, etc., the computer infrastructure that performs the process steps of the invention for one or more customers. These customers may be, for example, any business that uses video technology. In return, the service provider can receive payment from the customer(s) under a subscription and/or fee agreement and/or the service provider can receive payment from the sale of advertising content to one or more third parties.

In still another embodiment, the invention provides a computer-implemented method for personalized video playback. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    initiating, by a computing device, a video playing session of a video;
    recording, by the computing device, user initiated playback actions during the video playing session as playback event data;
    determining, by the computing device, reactions of a user to the video playback session based on received audio or visual reaction data of the user;
    determining, by the computing device, context data based on content of the video, and saving the context data;
    determining, by the computing device, insights regarding the user playback event data based on the audio or visual reaction data of the user and the context data;

generating, by the computing device, one or more recommendations for automatic video functions based on the insights; and presenting, by the computing device, the one or more recommendations to the user for acceptance or rejection, wherein the one or more recommendations are recommendations for one or more rules to be automatically implemented during future video playing sessions.

2. The method of claim 1, further comprising:
receiving, by the computing device, user registration information; and
saving the user registration information in a user registration database.

3. The method of claim 2, further comprising sending, by the computing device, the user registration information to a remote server.

4. The method of claim 1, further comprising sending to a remote server, by the computing device, at least one selected from the group consisting of the insights and the one or more recommendations.

5. The method of claim 1, further comprising:
recording, by the computing device, the reactions of the user with the playback event data.

6. The method of claim 1, further comprising:
analyzing, by the computing device, the reactions of the user to determine if the reactions indicate a lack of user comprehension regarding the video playing session;
presenting, by the computing device, the one or more recommendations to the user to accept or reject, wherein the one or more recommendations are selected from the group consisting of: recommendations for a rule to implement a function to address the indication of a lack of user comprehension of text-based content; and recommendations for a rule to implement a function to address the indication of a lack of user comprehension of audio content; and
receiving, by the computing device, a user selection regarding acceptance or rejection of the one or more recommendations.

7. The method of claim 6, wherein the receiving the user selection comprises receiving acceptance of the one or more recommendations, the method further comprising saving, by the computing device, the rule to automatically implement the accepted one or more recommendations.

8. The method of claim 7, further comprising sending, by the computing device, the rule to a remote server.

9. The method of claim 1, wherein the one or more recommendations include a recommendation for a rule to automatically display subtitles on the video.

10. The method of claim 1, wherein the context data is at least one selected from the group consisting of: a person in the video; and text in the video.

11. A computer program product for personalizing video playback, the computer program product comprising a computer readable storage medium having program instructions embodied therewith, the program instructions executable by a computing device to cause the computing device to:
initiate a video playing session of a video;
record user initiated pause and replay actions during the video playing session as playback event data in a video playback repository;
determine reactions of a user to the video playing session based on received audio or visual reaction data of the user;
determine video comprehension insights regarding the user playback event data based on the audio or visual reaction data of the user and content of the video;
generate one or more recommendations for automatic video functions based on the video comprehension insights;
present the one or more recommendations to the user for acceptance or rejection, wherein the one or more recommendations are recommendations for one or more rules to be automatically implemented during future video playing sessions; and
save the one or more recommendations as rules to automatically implement the recommendation.

12. The computer program product of claim 11, wherein the program instructions further cause the computing device to receive user registration information and save the user registration information in a user registration database.

13. The computer program product of claim 12, wherein the program instructions further cause the computing device to send the user registration information to a remote server.

14. The computer program product of claim 11, wherein the program instructions further cause the computing device to send, to a remote server, at least one selected from the group consisting of the video comprehension insights and the one or more recommendations.

15. The computer program product of claim 11, wherein the program instructions further cause the computing device to: record the reactions of the user with the playback event data in the video playback repository.

16. The computer program product of claim 11, wherein the program instructions further cause the computing device to:
receive a user selection regarding acceptance or rejection of the one or more recommendations.

17. The computer program product of claim 11, wherein the program instructions further cause the computing device to send the one or more rules to a remote server.

18. A system for personalizing video playback, comprising:
a CPU, a computer readable memory and a computer readable storage medium associated with a computing device;
program instructions to initiate a video playing session of a video;
program instructions to record user initiated playback actions during the video playing session as playback event data;
program instructions to determine reactions of a user to the video playing session based on received audio or visual reaction data of the user;
program instructions to determine context data based on content of the video, and saving the context data;
program instructions to determine insights regarding the user playback event data utilizing the audio or visual reaction data of the user and the context data;
program instructions to generate one or more recommendations for automatic video functions based on the insights; and
program instructions to present the one or more recommendations to the user for acceptance or rejection, wherein the recommendations are recommendations for one or more rules to be automatically implemented during future video playing sessions,
wherein the program instructions are stored on the computer readable storage medium for execution by the CPU via the computer readable memory.

19. The system of claim 18, further comprising:
program instructions to send the determined insights to a remote server;
program instructions to receive one or more recommendations from the remote server, wherein the one or more recommendations are based on aggregate insights from multiple users and are directed to automatically initiating a playback action to address aggregate watching patterns of the multiple users; and
program instructions to save the one or more recommendations as rules to automatically implement the one or more recommendations.

20. The system of claim 19, wherein the one or more recommendation are selected from at least one of the group consisting of: recommendations to automatically pause the video; recommendations to automatically display subtitles on the video; and recommendation to automatically play back a segment of the video.

* * * * *